United States Patent [19]

Willis

[11] 4,450,302

[45] May 22, 1984

[54] PEROXIDE BLENDS

[75] Inventor: Chester R. Willis, East Marlborough Township, Chester County, Pa.

[73] Assignee: Hercules Incorporated, Wilmington, Del.

[21] Appl. No.: 406,406

[22] Filed: Aug. 9, 1982

[51] Int. Cl.$^3$ .......................................... C07C 179/06
[52] U.S. Cl. ................................... 502/150; 568/559; 568/558; 568/561; 252/186.23; 260/502 R; 525/387
[58] Field of Search ...................... 568/558, 559, 561; 252/186; 260/502 R, 502

[56] References Cited

U.S. PATENT DOCUMENTS

| | | | |
|---|---|---|---|
| 2,668,180 | 2/1954 | Boardman | 568/561 |
| 2,826,570 | 3/1958 | Ivett | 568/559 |
| 2,888,424 | 5/1959 | Precople et al. | 568/559 |
| 3,079,370 | 2/1963 | Precople et al. | 568/559 |
| 4,202,790 | 5/1980 | Steller | 568/561 |
| 4,239,644 | 12/1980 | Nambu et al. | 568/561 |

*Primary Examiner*—Werren B. Lone

[57] ABSTRACT

Disclosed are novel blends of peroxides that have melting points of about 5° C. and lower. The blends consist essentially of (1) t-butyl cumyl peroxide, (2) bis(α-t-butylperoxyisopropyl)benzene, and (3) dicumyl peroxide.

6 Claims, No Drawings

PEROXIDE BLENDS

This invention relates to the chemical art. Particularly, this invention relates to novel peroxide blends that have melting points of about 5° C. and lower and which are useful in the crosslinking of polymers such as polyethylene, EPDM, and copolymers of ethylene and vinyl acetate.

In this specification and in the claims, all parts and percentages are by weight unless otherwise specified.

The blends of this invention consist essentially of:

(1) from about 40% to about 60% t-butyl cumyl peroxide;

(2) from about 5% to about 25% of a mixture of the meta and para isomers of bis($\alpha$-t-butylperoxyisopropyl) benzene, the mixture of meta and para isomers being in the proportion of between 1.5:1 to 4:1; and (3) dicumyl peroxide to 100%.

Preferred blends will consist essentially of from about 45% to about 55% of (1); from about 10% to about 25% of (2); and (3) to 100%.

Dicumyl peroxide and its method of preparation are well known in the art. Dicumyl peroxide has the formula

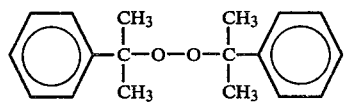

Dicumyl peroxide, peroxide (3) above, is a known crosslinking agent for certain polymers such as polyethylene. See, for example, U.S. Pat. Nos. 2,826,570, 2,888,424 and 3,079,370.

Dicumyl peroxide has a melting point of about 38° C.

Dicumyl peroxide is prepared by reaction of essentially equimolar portions of cumene hydroperoxide and $\alpha,\alpha$-dimethylbenzyl alcohol in an organic diluent (that will not react with the reactants or the peroxide reaction product) in the presence of a catalyst at a temperature of from about 30° C. to about 75° C. Suitable catalyst include p-toluenesulfonic acid, sulfuric acid, boron trifluoride etherate, and benzene sulfonic acid.

Dicumyl peroxide is available commercially in purities of from about 90% to 100%. Impurities present, if any, will include unreacted alcohol, unreacted hydroperoxide, $\alpha$-methylstyrene, acetophenone, and cumene.

Bis($\alpha$-t-butylperoxyisopropyl) benzene, peroxide (2) above, is well known in the art as are methods for its preparation. This bisperoxide has the formula

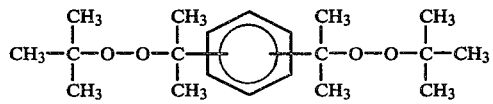

Specific examples of the bisperoxide are the meta and para isomers thereof. Mixtures of the meta and para isomers are commercially available and are preferred for use in this invention. The meta and para isomers are solid at room temperature (about 23° C.) as are all mixtures thereof. The meta isomer melts at about 52° C., the para isomer melts at about 79° C., and the eutectic mixture (80% meta isomer) melts at about 45° C. The preferred mixtures for use in this invention will consist of the meta and para isomers in a proportion of between about 1.5:1 to 4:1. These mixtures of the meta and para isomers are available commercially in purities of from about 90% to 100%. Impurities present, if any, will include t-butyl hydroperoxide, and the meta and para isomers of diisopropenylbenzene and bis(2-hydroxypropyl)benzene.

Bis($\alpha$-t-butylperoxyisopropyl) benzene is a crosslinking agent for certain polymers such as polyethylene. See U.S. Pat. No. Re. 25,941.

t-butyl cumyl peroxide, peroxide (1) above, is well known in the art as are methods for its preparation. This peroxide has the formula

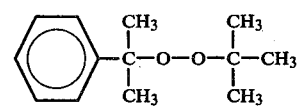

t-butyl cumyl peroxide, also referred to as $\alpha,\alpha$-dimethylbenzyl t-butyl peroxide, has a melting point of about 15.5° C. It can be prepared in accordance with the teachings of U.S. Pat. No. 2,668,180—see particularly Example V thereof.

t-butyl cumyl peroxide is available in purities of from about 90% to 100%. Impurities present, if any, will include cumene hydroperoxide, $\alpha,\alpha$-dimethylbenzyl alcohol, t-butyl hydroperoxide, acetophenone, and $\alpha$-methylstyrene.

The blends of this invention are easily and readily prepared by dissolving the desired amounts of peroxides (2) and (3) in peroxide (1) at room temperature (about 23° C.). Heat may be applied to hasten dissolution, if desired.

Table I below sets forth peroxide blends of this invention. Melting point was determined by freezing the blend to about −70° C. and then determining the temperature at which the blend became a liquid.

TABLE I

| Example | Dicumyl Peroxide Purity | Dicumyl Peroxide % | t-Butyl Cumyl Peroxide Purity | t-Butyl Cumyl Peroxide % | Bis($\alpha$-t-butylperoxyisopropyl)benzene Purity | Bis($\alpha$-t-butylperoxyisopropyl)benzene Meta/Para Ratio | Bis($\alpha$-t-butylperoxyisopropyl)benzene % | Melting Point °C. |
|---|---|---|---|---|---|---|---|---|
| 1 | 91.0 | 32.8 | 99.0 | 49.2 | 91.0 | 1.93/1 | 18.0 | 5.0 |
| 2 | 91.0 | 38.4 | 99.0 | 56.6 | 91.0 | 1.93/1 | 5.0 | 5.0 |
| 3 | 99.7 | 32.0 | 99.7 | 47.6 | 99.56 | 4/1 | 20.4 | 5.0 |
| 4 | 99.7 | 18.0 | 99.7 | 57.4 | 99.56 | 4/1 | 24.6 | 5.0 |
| 5 | 91.0 | 38.0 | 99.0 | 46.5 | 91.0 | 1.93/1 | 15.5 | 5.0 |
| 6 | 91.0 | 25.0 | 99.0 | 56.25 | 91.0 | 1.93/1 | 18.75 | 5.0 |
| 7 | 91.0 | 26.4 | 99.0 | 56.0 | 91.0 | 1.93/1 | 17.6 | 5.0 |
| 8 | 91.0 | 35.4 | 99.0 | 41.0 | 91.0 | 1.93/1 | 23.6 | 5.0 |
| 9 | 91.0 | 36.0 | 99.0 | 54.0 | 91.0 | 1.93/1 | 10.0 | 1.5 |
| 10 | 91.0 | 30.0 | 99.0 | 52.5 | 91.0 | 1.93/1 | 17.5 | 1.5 |
| 11 | 99.7 | 30.0 | 99.7 | 49.0 | 99.56 | 4/1 | 21.0 | 1.5 |
| 12 | 99.7 | 20.0 | 99.7 | 56.0 | 99.56 | 4/1 | 24.0 | 1.5 |
| 13 | 91.0 | 30.0 | 99.0 | 50.0 | 91.0 | 1.93/1 | 20.0 | 1.5 |

Dicumyl peroxide and bis($\alpha$-t-butylperoxyisopropyl) benzene are solids at room temperature. One of the disadvantages of these peroxides is that they must be melted in order to be uniformly dispersed in polymers, such as polyethylene, prior to cure. This causes additional expense to the user and is a source of danger as there is always the possibility of over-heating, particularly by unskilled personnel, which can result in rapid decomposition of the peroxide and may even result in explosion. Blending of the solid peroxides with polymers, such as polyethylene, is not satisfactory in that it is difficult, if not impossible, to obtain uniform dispersion of the peroxide throughout the polymer. It is essential that the peroxide be uniformly dispersed in order to provide uniform curing or crosslinking of the polymer.

The peroxide blends of this invention are easily and readily admixed with such polymers as polyethylene to provide essentially uniform blends of polymer and peroxide without undesirable effects. An important aspect of this invention is that the blends, being liquid at relatively low temperatures, can be employed in low temperature climates. The polymer-peroxide compositions, after curing, have good physical properties. As above set forth, the blends of this invention have utility as crosslinking agents for polymers such as polyethylene, EPDM, and copolymers of ethylene and vinyl acetate.

It is to be understood that the above description and examples are illustrative of this invention and not in limitation thereof.

I claim as my invention:

1. As a new composition of matter, a peroxide blend having a melting point of about 5° C. and lower consisting essentially of:
    (1) from about 40% to about 60% t-butyl cumyl peroxide;
    (2) from about 5% to about 25% of a mixture of the meta and para isomers of bis($\alpha$-t-butylperoxyisopropyl) benzene, the mixture of meta and para isomers being in the proportion of between 1.5:1 to 4:1; and
    (3) dicumyl peroxide in an amount sufficient to make the total of (1), (2) and (3) equal to 100%.

2. As a new composition of matter, a peroxide blend having a melting point of about 5° C. and lower consisting essentially of:
    (1) from about 45% to about 55% t-butyl cumyl peroxide;
    (2) from about 10% to about 25% of a mixture of the meta and para isomers of bis($\alpha$-t-butylperoxyisopropyl) benzene, the mixture of meta and para isomers being in the proportion of between 1.5:1 to 4:1; and
    (3) dicumyl peroxide in an amount sufficient to make the total of (1), (2) and (3) equal to 100%.

3. The composition of claim 1 wherein peroxide (2) of the blend is a mixture of the meta and para isomers in the ratio of 1.93 to 1.

4. The composition of claim 1 wherein peroxide (2) of the blend is a mixture of the meta and para isomers in the ratio of 4 to 1.

5. The composition of claim 2 wherein peroxide (2) of the blend is a mixture of the meta and para isomers in the ratio of 1.93 to 1.

6. The composition of claim 2 wherein peroxide (2) of the blend is a mixture of the meta and para isomers in the ratio of 4 to 1.

* * * * *